W. G. BLOECHER.
WHEEL RIM.
APPLICATION FILED APR. 25, 1914.

1,118,728.

Patented Nov. 24, 1914.
2 SHEETS—SHEET 1.

W. G. BLOECHER.
WHEEL RIM.
APPLICATION FILED APR. 25, 1914.

1,118,728.

Patented Nov. 24, 1914.
2 SHEETS—SHEET 2.

WITNESSES

INVENTOR
William G. Bloecher
BY Munn & Co.
ATTORNEYS

UNITED STATES PATENT OFFICE.

WILLIAM GEORGE BLOECHER, OF BALTIMORE, MARYLAND.

WHEEL-RIM.

1,118,728.   Specification of Letters Patent.   Patented Nov. 24, 1914.

Application filed April 25, 1914.   Serial No. 834,515.

*To all whom it may concern:*

Be it known that I, WILLIAM G. BLOECHER, a citizen of the United States, and a resident of Baltimore, State of Maryland, have invented a new and useful Improvement in Wheel-Rims, of which the following is a specification.

My invention is an improvement in wheel rims, and has for its object to provide a rim of the character specified, especially adapted for use with wire wheels and designed for coöperation with interchangeable tire carrying rims, the interchangeable rims seating outside of the wheel rim, the wheel rim having at one side edge a fixed stop and having at the opposite side edge a series of releasable stops to permit the quick removal and replacement of the interchangeable rims.

Figure 1:
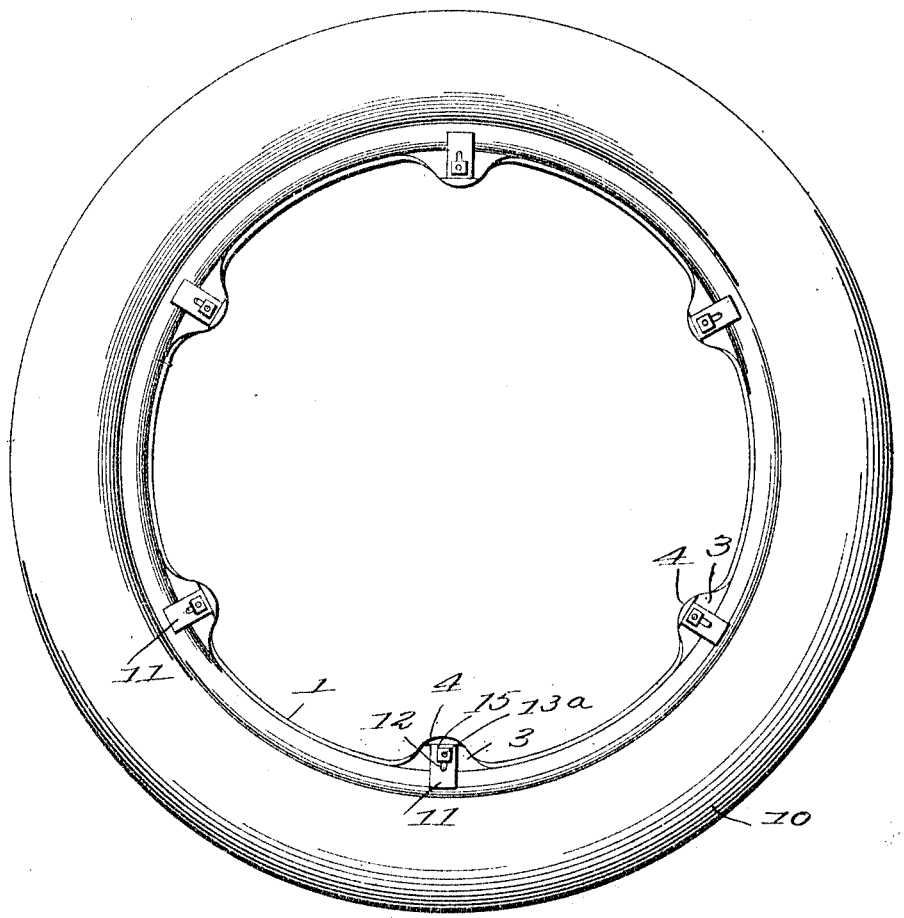
Figure 3:
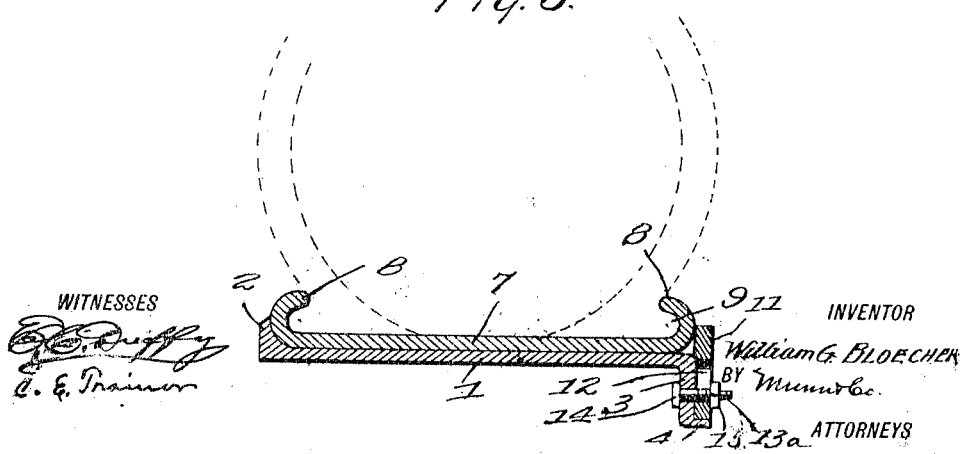
Figure 2:
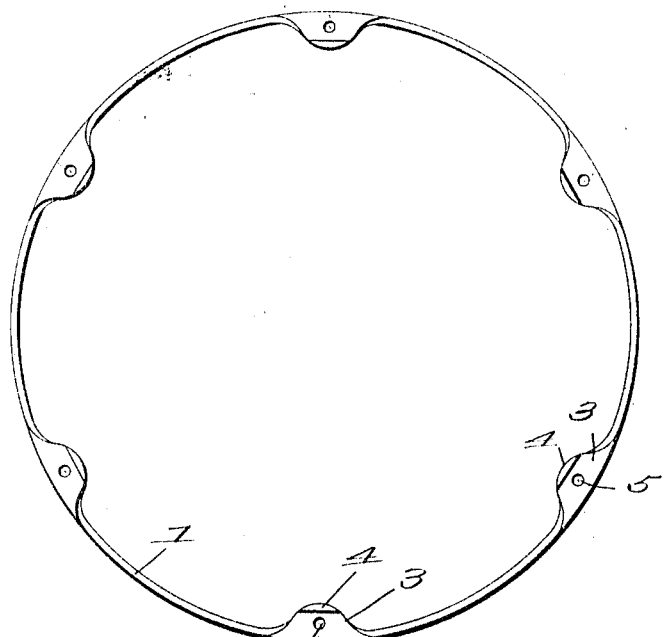
Figure 4:
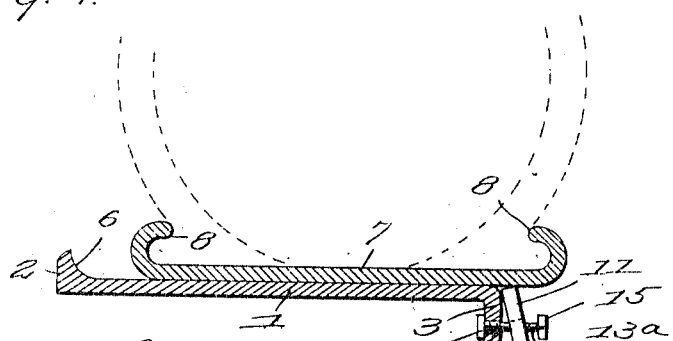
Figure 5:
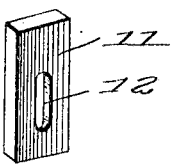
Figure 6:

In the drawings.—Figure 1 is a side view of the improved rim with the tire in place, Fig. 2 is a similar view of the inner member of the rim, Figs. 3 and 4 are transverse sections of the rim, with the parts in different positions, Fig. 5 is a perspective view of one of the clamping elements, and Fig. 6 is a top plan view of the other clamping elements.

In the present embodiment of the invention the rim 1 of the wheel is provided at one side edge with a radial outwardly extending rib 2, and at the other side edge with a series of inwardly extending radial lugs 3, each of which is provided with a lateral outwardly extending stop 4, at its inner end. Each of the lugs 3 is provided with a perforation 5, and the inner face of the rib or flange 2 is cut away on an arc, as shown at 6, to fit the outer member to be hereinafter described.

The rim which carries the tire consists of a ring 7, having at each side edge an overlying flange 8, the said flanges extending entirely around the ring and being adapted to engage the holding ribs 9 of a shoe or casing 10. The outer member or ring 7 is of sufficient diameter to fit outside of the wheel rim or inner member 1, and the said member is adapted to be seated on the inner member after the shoe is in place, as indicated in Figs. 4 and 5. When the outer member 7 is in place on the inner member, the outer face of one of the flanges 8 fits closely against the inner face 6 of the rib or flange 2, as shown in Fig. 3, and the outermost portion of the opposite flange 8 will be flush with the outer faces of the lugs 3.

Mechanism is connected with each of the lugs 3, for holding the outer member in place, and each of the said mechanisms comprises a plate 11, having a longitudinally extending slot 12, which is adapted to register with the perforation 5 of the adjacent lug 3. A bolt is provided for connecting each of the plates to the lug 3, each bolt consisting of portions 13 and 13ᵃ of unequal diameter and oppositely threaded as shown in Fig. 6. The head 14 of the bolt is at the outer end of the larger plate 13, while a nut 15 engages the portion 13ᵃ of the bolt. The slot 12 of each of the plates 11 is of such length that when the nut 15 is loosened as shown in Fig. 4, the plate may drop down into the position of the said figure so that the upper end is below the outer member 7 of the rim, and the said outer member may slip easily over the plates. When however, the plate is lifted as shown in Fig. 3, until the lower end thereof rests upon the outer face of the stop 4, the upper end of the plate will engage outside of the adjacent flange 8 to prevent lateral movement of the outer rim member 7. Since one of the plates 11 is arranged at each lug 3, the outer member 7 will be held firmly against lateral movement. The said member cannot move in the opposite direction because of the flange 2 of the inner member.

The improved rim is especially adapted for use with wire wheels, and for permitting clencher type tires to be attached to the said wheels. When it is desired to remove the tire, the nuts 15 of all of the bolts 13—13ᵃ are loosened as shown in Fig. 4, until the inner ends of the plates 1 may pass beyond the stops 4. The plates are then placed as shown in Fig. 4, after which the tire and its rim may be moved laterally from the wheel, and a new tire and rim placed on the wheel. After the tire and rim have been properly seated as shown in Fig. 3, the plates 11 are arranged as shown in Fig. 3, and the nuts 15 are tightened. The portion 13 of each of the bolts is threaded left-handed, and the purpose of this threading is to permit quick replacement in case the right-handed thread should be stripped or in case the bolt should be broken off.

In practice, an extra inflated tire on the rim 7—8 would be carried. Should the tire of one of the wheels be punctured or otherwise injured, the nuts 15 of the wheel are loosened to permit the plates 11 to be placed as shown in Fig. 4, and the injured tire and its rim are removed from the wheel. The inflated tire of this rim is then placed on the wheel, and the plates 11 are arranged in locked position. The injured tire may then be carried to a place of repair.

I claim:—

1. A wheel rim having means for holding a demountable rim in place, said wheel rim having at one side a radial outwardly extending flange and having at the opposite side a series of spaced radial inwardly extending lugs, each provided at its inner end with an outwardly extending stop and with a threaded opening adjacent to the stop, a bolt engaging each opening, a plate adapted to fit the outer face of each stop and having a longitudinally extending slot through which the bolt passes, a nut threaded on to each of the bolts, each plate and the slot thereof being of a length to cause the plate to extend beyond the inner peripheral surface of the demountable rim when the inner end of the plate rests upon the stop and to permit the outer end of the plate to pass within the inner periphery of the demountable rim when the plate is released from the stop, the bolt consisting of portions of unequal diameter and oppositely threaded, the larger of the said portions being adjacent to the head and engaging the threaded opening of the lug, and a demountable rim adapted to seat outside of the wheel rim with one side edge engaging the flange and with the plates engaging the opposite edge when the said plates are seated on the stops.

2. A wheel rim having means for holding a demountable rim in place, said wheel rim having at one side a radial outwardly extending flange and having at the opposite side a series of spaced radial inwardly extending lugs, each provided at its inner end with an outwardly extending stop and with a threaded opening adjacent to the stop, a bolt engaging each opening, a plate adapted to fit the outer face of each lug adjacent the stop and having a longitudinally extending slot through which the bolt passes, a nut threaded on to each of the bolts, each plate and the slot thereof being of a length to cause the plate to extend beyond the inner peripheral surface of the demountable rim when the inner end of the plate rests upon the stop and to permit the outer end of the plate to pass within the inner periphery of the demountable rim when the plate is released from the stop, the bolt consisting of portions of unequal diameter and oppositely threaded, the larger of the said portions being adjacent to the head and engaging the threaded opening of the lug.

WILLIAM GEORGE BLOECHER.

Witnesses:
JACOB WENGER,
JOS. M. BEAVIN.